June 29, 1926.
S. W. HYATT
LAMP MOUNTING
Filed July 25, 1925
1,590,376
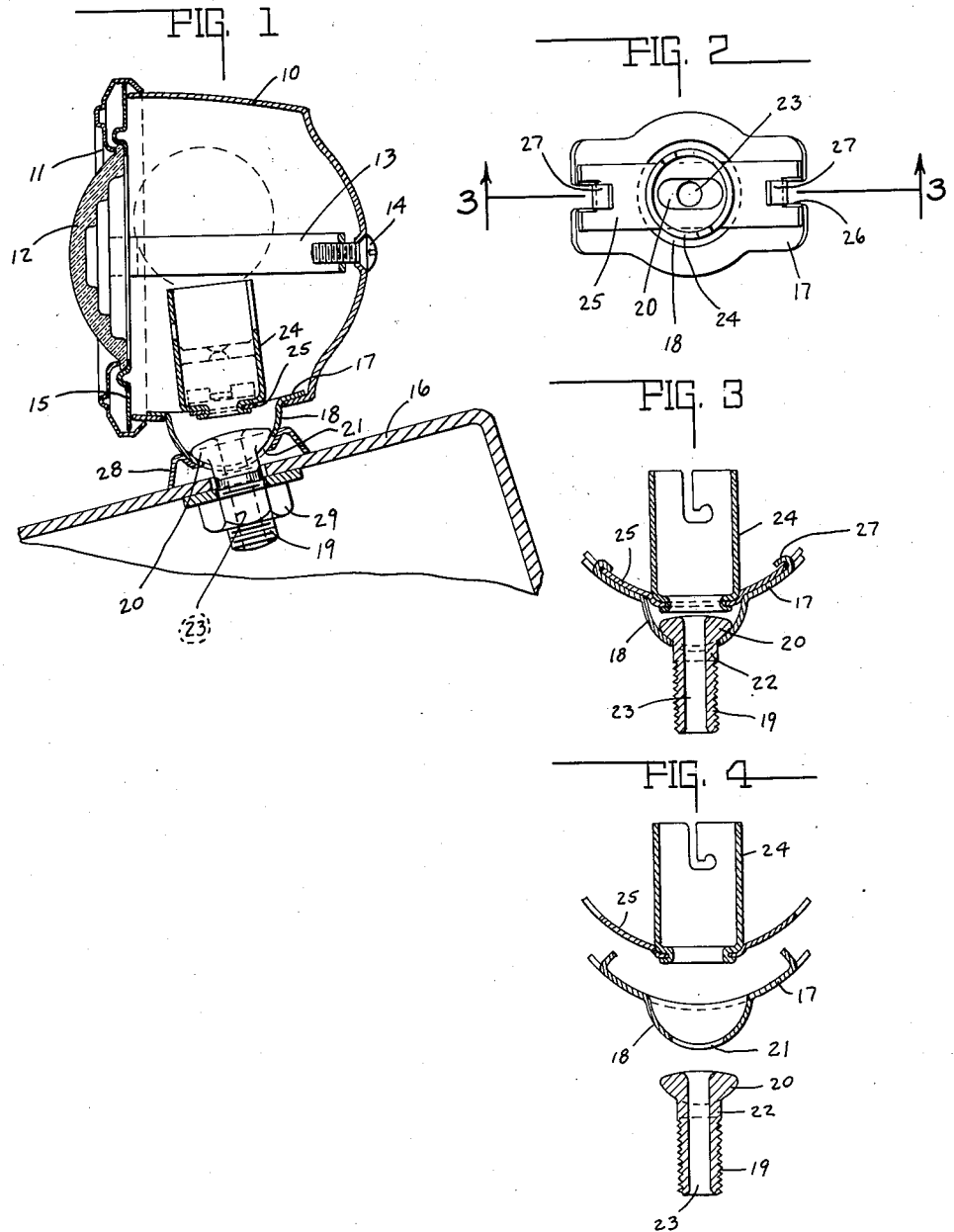
INVENTOR.
SAMUEL W. HYATT.
BY
ATTORNEYS.

Patented June 29, 1926.

1,590,376

UNITED STATES PATENT OFFICE.

SAMUEL W. HYATT, OF CONNERSVILLE, INDIANA, ASSIGNOR, BY MESNE ASSIGNMENTS, TO INDIANA LAMP CORPORATION, OF CONNERSVILLE, INDIANA, A CORPORATION OF DELAWARE.

LAMP MOUNTING.

Application filed July 25, 1925. Serial No. 46,118.

This invention relates to a lamp mounting, and particularly an adjustable mounting for automobile cowl or side lamps.

The principal object of the invention is to provide a lamp mounting which may be readily secured to the cowl of an automobile or other structural support, whereby the wiring may be permitted to pass through a hollow bolt, and the position of the lamp may be adjusted upon mounting so as to adapt it to variations and inclinations of the supporting surface.

Other features of the invention reside in the arrangement and construction of the various associated parts of the mounting as will be hereinafter more fully set forth and described.

The full nature of the invention will be understood from the accompanying drawings and the following description and claims.

Fig. 1 is a central vertical section through a lamp and the mounting therefor. Fig. 2 is a plan view looking down on the mounting with the lamp socket attached thereon. Fig. 3 is a section taken on the line 3—3 of Fig. 2. Fig. 4 is the same as Fig. 3 showing the parts in separated position before being attached.

In the drawings there is shown a lamp comprising a casing 10, a lens ring 11 and lens 12. The lens ring 11 is secured to the rearwardly extending bracket 13 adapted to be drawn and secured in place by the screw 14 extending through the rear of the casing. The free ends of the rearwardly extending bracket 13, which is U-shaped to embrace the lamp bulb, may be secured or interlocked with the lens ring 11 by either hooking the ends within the inwardly turned flange of the ring, or soldering or welding the same, the same not being shown herein and forming no part of this invention. The lens is clamped between the ring 11, secured by said bracket, and the annular plate 15 which is forced thereby against the forward edge of the casing.

The structure for securing the lamp in proper position on a supporting surface 16 such as the cowl of an automobile, comprises a plate 17 of such curvature as the lamp casing which is adapted to fit snugly against the inner surface of the lower portion thereof. Said plate is provided with a depending hemispherical portion 18 adapted to protrude through a suitable opening in the lower portion of said casing as shown in Fig. 1. Said hemispherical portion is provided with an opening through which the hollow bolt 19 may extend, said bolt being provided with a head 20 having a curved surface to correspond with that of the hemispherical portion as shown in Fig. 3. The opening 21 through which the bolt extends is elongated, and only sufficiently wide to receive the squared or rectangular neck portion 22 of said bolt so as to prevent its turning therein but permitting its longitudinal movement. Said bolt is hollow so as to provide a passageway 23 through which wires may extend into the lamp socket 24.

The lamp socket 24 is rigidly secured to a saddle 25 having outwardly extending and upwardly curved portions of the same curvature as the plate 17. The ends of the saddle are formed with recesses 26 into which the ears 27 of the plate may extend and be bent over for rigidly securing the saddle thereto whereby the plate with its downwardly extending hemispherical portion and the lamp socket will become a fixed unit. The said unit is fixedly mounted within the lamp casing by spot welding or otherwise securing the plate 17 thereto after having been mounted in place.

In mounting the lamp upon the support 16, a perforated and recessed shell or spacing member 28, of the usual character is positioned for receiving the hemispherical member 18 of the plate 17 and thereby supporting the lamp in fixed or adjusted position, upon the nut 29 being tightened on said bolt. This has the effect of clamping said hemispherical member between the curved head of the bolt and the member 28. When loosened, it is obvious that the lamp may be adjusted in a longitudinal plane about the center of curvature of the portion 18, said portion sliding upon the member 28 to the extent of the elongated opening 21 as shown in Fig. 1. Thus the relative position of the lamp with respect to the member 28, the nut 19 and support 16 may be adjusted to compensate for variations in slope or curvature of the cowl body or other support 16.

The invention claimed is:

1. A lamp support comprising a lamp socket, a saddle to which said lamp socket is secured, a plate to which said saddle is secured, a downwardly extending spherical portion formed on said plate and having an enlarged opening therethrough, and a bolt adapted to extend through said opening and having an enlarged head thereon for seating in said spherical portion, whereby said bolt will normally be free to move about the center of curvature over said portion within the limits of the opening therein.

2. In a lamp having a curved casing, a lamp socket, a saddle to which said lamp socket is secured, curved to fit snugly within said casing, a similar curved plate adapted to be secured to said casing for receiving and holding said saddle in place, a downwardly projecting spherical portion on said plate extending through an opening in said casing and having an enlarged opening therein, a bolt adapted to extend through said opening and having an enlarged head adapted to seat within said spherical portion so as to permit of movement therebetween about the center of curvature thereof, and a concave member into which said portion is adapted to seat and through which said bolt may extend for supporting said lamp in adjusted position and permitting it to be clamped therein, substantially as shown and described.

In witness whereof, I have hereunto affixed my signature.

SAMUEL W. HYATT.